(12) United States Patent
Kawamura et al.

(10) Patent No.: US 9,358,549 B2
(45) Date of Patent: Jun. 7, 2016

(54) METHOD FOR MANUFACTURING CARBIDE FOR REINFORCING RUBBER ARTICLES

(75) Inventors: Masanori Kawamura, Nishi-ku (JP); Keiji Asatsuma, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 372 days.

(21) Appl. No.: 14/004,538

(22) PCT Filed: Apr. 16, 2012

(86) PCT No.: PCT/JP2012/002625
§ 371 (c)(1),
(2), (4) Date: Sep. 11, 2013

(87) PCT Pub. No.: WO2012/144188
PCT Pub. Date: Oct. 26, 2012

(65) Prior Publication Data
US 2014/0001293 A1 Jan. 2, 2014

(30) Foreign Application Priority Data
Apr. 19, 2011 (JP) ................................ 2011-093426

(51) Int. Cl.
*B02C 19/00* (2006.01)
*B02C 23/00* (2006.01)
(Continued)

(52) U.S. Cl.
CPC .............. *B02C 23/00* (2013.01); *B02C 19/0056* (2013.01); *C04B 35/56* (2013.01); *C04B 35/6267* (2013.01); *C04B 35/62204* (2013.01); *C04B 35/62695* (2013.01); *C08K 3/04* (2013.01); *C08K 3/14* (2013.01); *C09C 1/44* (2013.01); *C04B 2235/424* (2013.01)

(58) Field of Classification Search
CPC .... B02C 23/00; B02C 19/00; B02C 19/0056; C01B 31/14; B01J 2/00; C09C 1/60; C09C 1/44; C08K 3/14; C08K 3/04; C04B 35/62695; C04B 35/6267; C04B 35/62204; C04B 35/56; C04B 2235/424
USPC ......... 23/314; 264/117; 425/222; 241/29, 30, 241/DIG. 31
See application file for complete search history.

(56) References Cited

U.S. PATENT DOCUMENTS 6,231,624 B1 5/2001 Vogler et al.
2005/0085583 A1 4/2005 Hong

FOREIGN PATENT DOCUMENTS

JP   A 5-17704    1/1993
JP   A 8-27394    1/1996
(Continued)

OTHER PUBLICATIONS

Jul. 29, 2014 Office Action issued in Chinese Patent Application No. 201280019027.4 (with translation).
(Continued)

*Primary Examiner* — Mark Rosenbaum
(74) *Attorney, Agent, or Firm* — Oliff PLC

(57) ABSTRACT

Disclosed is a method for manufacturing a carbide for reinforcing rubber articles that is capable of effectively utilizing polymer waste. The method includes the steps of mixing a carbide, obtained by thermal decomposition or incomplete combustion of polymer waste and pulverized by grinding, with carbon black to obtain a mixture of the carbide and the carbon black, and granulating the mixture using a granulating machine at a rotation speed of 70 rpm to 130 rpm.

6 Claims, 2 Drawing Sheets

(51) Int. Cl.
*C04B 35/56* (2006.01)
*C04B 35/622* (2006.01)
*C04B 35/626* (2006.01)
*C09C 1/44* (2006.01)
*C08K 3/04* (2006.01)
*C08K 3/14* (2006.01)

(56) References Cited

FOREIGN PATENT DOCUMENTS

| JP | A 10-60301 | 3/1998 |
| JP | A 2010-141099 | 6/2010 |
| JP | A-2010-274223 | 12/2010 |
| WO | WO 2010/137352 A1 | 12/2010 |
| WO | WO 2011/161932 A1 | 12/2011 |

OTHER PUBLICATIONS

Nov. 11, 2014 Search Report issued in European Patent Application No. 12774350.8.
Jul. 17, 2012 Search Report issued in International Patent Application No. PCT/JP2012/002625 (with translation).
Jan. 27, 2015 Office Action issued in Japanese Patent Application No. 2011-093426.
Sep. 15, 2015 Office Action issued in European Patent Application No. 12 774 350.8.

METHOD FOR MANUFACTURING CARBIDE FOR REINFORCING RUBBER ARTICLES

TECHNICAL FIELD

The present invention relates to a method for manufacturing carbide for reinforcing rubber articles and in particular to a method for manufacturing a carbide for reinforcing rubber articles that is capable of effectively utilizing polymer waste.

BACKGROUND ART

Conventionally, for the purpose of developing functional materials, a variety of polymeric materials have been produced industrially, such as rubber materials, resin materials, and the like. On the other hand, the growth of the polymer industry has brought about mass production and consumption of general-purpose materials, and the processing of polymer waste is a crucial problem that needs to be solved as soon as possible. In order to solve this problem, technological progress in the reuse, recycling, and the like of polymeric materials is essential. For example, along with the spread of motorization, tires made from a rubber material are now mass produced and mass consumed as an essential automobile component, yielding an enormous number of used tires. Research into recycling and effective utilization of used tires has thus been promoted, and in particular the recovery of usable material has become a major issue. For example, JP8-027394A (PTL 1) discloses a method for producing carbon black by thermal decomposition or incomplete combustion of organic waste such as waste tires.

The carbide obtained by thermal decomposition or incomplete combustion of polymer waste normally includes matter other than hydrocarbons, and therefore unlike the carbon material which is obtained by thermal decomposition or incomplete combustion of hydrocarbons and which is formed nearly entirely from carbon (i.e. carbon black in the original sense), this carbide does not exhibit a sufficient reinforcing effect with respect to a rubber composition at the time of combination with rubber. Hence, room for improvement remained in the recovery and effective utilization of the value offered by polymer waste.

Therefore, JP2010-141099A (PTL 2) discloses a method for obtaining carbon material for reinforcing rubber by mixing a carbide with carbon black, the carbon material having a sufficient reinforcing effect even when combined with rubber components despite the inclusion of a carbide conventionally considered to have a weak reinforcing property for rubber.

CITATION LIST

Patent Literature

PTL 1: JP8-027394A
PTL 2: JP2010-141099A

SUMMARY OF INVENTION

With the method disclosed in PTL 2, however, a great decrease in physical properties has been observed in the mixing process for the mixture of the carbide and carbon black. Accordingly, it has been considered necessary to discover a method of manufacturing a carbide for reinforcement that effectively utilizes polymer waste and that can obtain rubber compounding physical properties approximately equivalent to the intended carbon black even in a mixture of powdered structural components which predominate during the manufacturing of carbon black.

In order to solve the above problems found in conventional techniques, it is therefore an object of the present invention to provide a method for manufacturing a carbide for reinforcing rubber articles that is capable of effectively utilizing polymer waste.

The inventors thoroughly investigated how to achieve the above object, and as a result discovered that by adjusting the granulation conditions during manufacture of a carbide for reinforcing rubber that includes a carbide obtained by thermal decomposition or incomplete combustion of polymer waste, an effect comparable to that of pure carbon black or a mixture of granular materials can be obtained for a granular mixture of powdered materials, conventionally considered to have an inferior reinforcing effect, thus leading to the completion of the present invention.

Namely, a method according to the present invention for manufacturing a carbide for reinforcing rubber articles includes the steps of mixing a carbide (A), obtained by thermal decomposition or incomplete combustion of polymer waste and pulverized by grinding, with carbon black (B) to obtain a mixture of the carbide (A) and the carbon black (B), and granulating the mixture using a granulating machine at a rotation speed of 70 rpm to 130 rpm.

By adjusting the method of mixing the carbide (A) and the carbon black (B), the mixing means, the mixing conditions, and the like to meet specific requirements, the rubber compounding properties when the obtained granular material is combined with rubber can be improved.

In the method according to the present invention for manufacturing a carbide for reinforcing rubber articles, a mixture mass ratio (A/B) of the carbide (A) to the carbon black (B) is preferably in a range of 1/99 to 50/50. The method according to the present invention for manufacturing a carbide for reinforcing rubber articles includes the step of granulating a granular mixture by keeping the filling rate (supply) of material to be granulated with respect to the granulating space low and keeping the rotation speed in the space low so as to keep the force necessary for crushing the granular material to a low level and to cause a mercury intrusion phenomenon to occur in a mercury porosimeter at a pressure range of 1,000 psi to 10,000 psi.

In the method according to the present invention for manufacturing a carbide for reinforcing rubber articles, the rotation speed of the granulating machine is preferably 110 rpm to 130 rpm in the step of granulating the mixture.

Furthermore, the carbon black (B) is preferably a powdered material, or a ground product of a granular material after granulation, obtained during manufacture of carbon black.

According to the present invention, by adjusting the granulation conditions during manufacture of a carbide for reinforcing rubber that includes a carbide obtained by thermal decomposition or incomplete combustion of polymer waste, an effect comparable to that of pure carbon black or a mixture of granular materials can be obtained for a granular mixture of powdered materials, which had been noted to have inferior vulcanized rubber properties, particularly tensile stress properties, upon combination with rubber.

BRIEF DESCRIPTION OF DRAWINGS

The present invention will be further described below with reference to the accompanying drawings, wherein.

DESCRIPTION OF EMBODIMENTS

The following describes the present invention in detail. The method according to the present invention for manufacturing a carbide for reinforcing rubber articles includes the step of mixing a carbide (A), obtained by thermal decomposition or incomplete combustion of polymer waste, with carbon black (B), both being in a powder state, to obtain a mixture of the carbide (A) and the carbon black (B).

In order to granulate the powder of the carbide (A) and the powder of the carbon black (B) under the conditions conventionally adopted in carbon black granulation, a large force is necessary to crush the granular particles. Furthermore, a phenomenon has been observed whereby almost no mercury can be caused to intrude in a mercury porosimeter at a pressure range of 1,000 psi to 10,000 psi. This phenomenon makes it difficult for a granular material of powders under conventional granulation conditions for the carbide (A) and carbon black (B) to progress through a crushing process from a granular material to minute lumps when combined with rubber, resulting in a less even dispersiveness in the rubber matrix. This granular material has thus been observed to have the defect of not achieving its intended performance. The size of the pores corresponds to the size at which rubber molecules in the rubber matrix that are caused to intrude at 1,000 psi to 10,000 psi in the mercury porosimeter can enter, and reduced rubber performance is predicted for a composition with which granular material with blocked pores has been combined.

Figure 2:
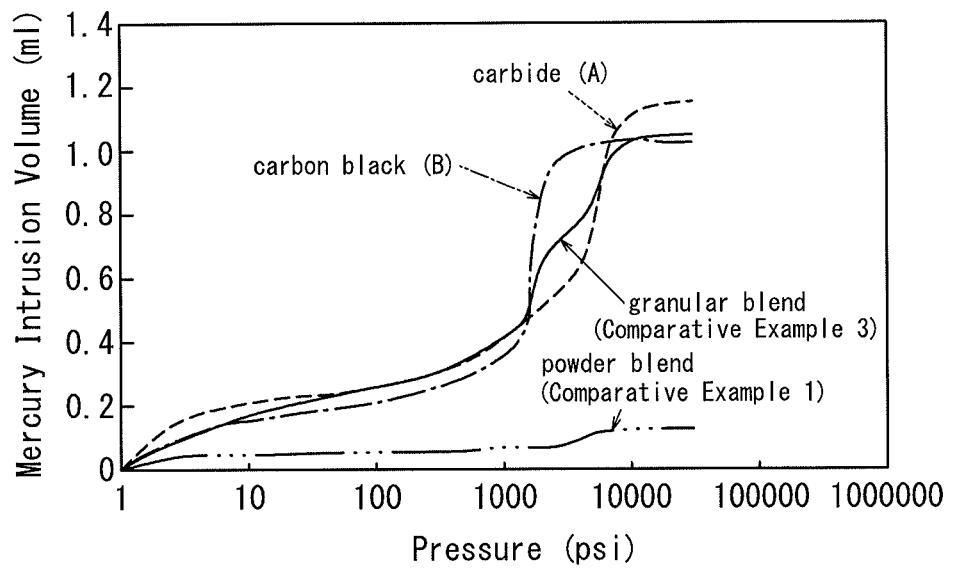
FIG. 2 illustrates the relationship between mercury intrusion volume and pressure (units: psi) for granular material of the carbide (A) (label: carbide), granular material of GPF class carbon black (B) (produced by Asahi Carbon Co., Ltd.) (label: carbon black), a blended material of the granular material of the carbide (A) and the granular material of the carbon black (B) (granular blend), and a granular material (powder blend) yielded by a blend material of a powder of the carbide (A) and the carbon black (B)

FIG. 2 shows the mercury porosimeter measurement values for a variety of granular materials including the blended granular material of powders with a conventional method. The above presumption is supported by how no intrusion is observed in the above pressure range for the measurement values of the powder blend.

In the method according to the present invention for manufacturing a carbide for reinforcing rubber articles, first the mixture ratio of the carbide (A) and the carbon black (B) is controlled to be a constant ratio in order to improve the reinforcing effect with respect to rubber articles and to guarantee rubber physical properties equivalent to those obtained with pure carbon black. Furthermore, controlling the mixture ratio of the carbide (A) and the carbon black (B) to be a constant ratio allows for suppression of changes in the physical properties due to differences in the mixture ratio. Upon attempting to optimize the mixture ratio of the carbide (A) and the carbon black (B), the inventors discovered that from the perspective of improving the reinforcing effect and of reducing the deterioration in other rubber properties, the mixture mass ratio (A/B) of the carbide (A) to the carbon black (B) should preferably be in a range of 1/99 to 50/50.

The above-described conditions for combination with a rubber composition are applied to the carbide for reinforcing rubber articles obtained with the method for manufacturing according to the present invention, and the carbide is normally used after being granulated in the same way as carbon black. In the method according to the present invention for manufacturing a carbide for reinforcing rubber articles, by granulating the mixture of the carbide (A) and the carbon black (B), i.e. by performing a granulation step after a mixing step, granulation of the carbide (A) and the carbon black (B) can be performed at the same place and the same time, thereby greatly improving operation efficiency. As described above, however, when applying conventional granulation conditions for carbon black, the crushing strength of the particles increases, and the mercury intrusion volume in the mercury porosimeter decreases, and a way of resolving these problems is necessary.

In other words, in the above granulation step, controlling the supply for the mixture of the carbide (A) and the carbon black (B) and the rotation speed of the granulating machine allows for a reduction in the force on the mixture, making it possible to suppress a reduction in the physical properties of the carbide for reinforcing rubber articles and to suppress a reduction in the quality of the rubber articles with which the carbide is combined. For example, the supply for the mixture is preferably in a range of 1 kg to 2 kg, and the rotation speed of the granulating machine is preferably in a range of 130 rpm or less, more preferably in a range of 70 rpm to 130 rpm, and even more preferably in a range of 110 rpm to 130 rpm. Setting the rotation speed of the granulating machine to a preferable range of 130 rpm or less can achieve even better physical properties when granulating the mixture in a powder state.

Note that the time required for granulation (granulation time) is not particularly limited, yet when the supply and the rotation speed are set to the above preferable ranges, the time is preferably in a range of 110 s to 130 s.

As the granulation method, either (i) a wet method for granulation using water or another liquid or (ii) a dry method that uses no medium may be adopted. When adopting a wet method as the granulation method, a drying step is necessary. As the granulating machine and the drying machine, machines typically used for granulation and drying of carbon black may be used. Examples include a tumbling granulator or other such granulating machine and a rotary dryer, pneumatic conveying dryer, fluidized dryer, tunnel dryer, or other such drying machine.

The following reasons are inferred as to why the mixture of powdered materials of the carbide (A) and the carbon black (B) during the granulation step contributes to the above increase in the crushing strength of the granular material and decrease in mercury intrusion volume in the mercury porosimeter.

The carbide (A) is not composed of pure carbon, but rather includes a variety of inorganic material (ash) attributable to polymer waste that undergoes thermal decomposition. It is thought that water added during the wet granulation step causes the elution of water-soluble components included in the ash into the granulation liquid. The water-soluble components included in the ash then cover the surface of the granular material, thereby increasing the crushing strength of the granular material and blocking the pores in the carbon components of the carbide (A) and the carbon black (B) so that the intrusion volume in the mercury porosimeter is reduced. In particular, it is presumed that under the granulation conditions used as manufacturing conditions for normal carbon black with a high shear strength, i.e. granulation conditions in which the supply of the mixture to the granulating machine is great and the rotation speed of the granulating machine is high (300 rpm to 700 rpm), the effect of elution into the granulation liquid of the water-soluble components included in the ash becomes salient, whereas under the conditions of the present invention, which are more relaxed than the above conditions, it is presumed that the effect of the above elution is reduced.

Note that for mixing the carbide (A) and the carbon black (B), a mixing machine such as a mixer, blender, air blender, or the like may be used. A granulating machine may also be used for mixing the carbide (A) and the carbon black (B).

In the method according to the present invention for manufacturing a carbide for reinforcing rubber articles, the carbide (A) that is obtained by thermal decomposition or incomplete combustion of polymer waste and pulverized by grinding is a remaining solid generated after emission of gas and liquid components in a raw material of polymer waste due to a thermal decomposition reaction or incomplete combustion reaction. The carbide (A) may include inorganic matter in the form of ash. The thermal decomposition or incomplete combustion of polymer waste is not particularly limited, and a variety of thermal decomposition methods and incomplete combustion methods may be adopted. For example, polymer waste may be collected in a pyrolysis furnace, and by supplying an anoxic gas heated in the pyrolysis furnace, the polymer waste can be thermally decomposed in an oxygen-free atmosphere. An anoxic gas is a gas without oxygen or oxides, and examples include inert gases such as nitrogen, argon, and helium, and flammable gases such as hydrogen, methane, and propane. Furthermore, the pyrolysis furnace is not particularly limited. For example, an oven-type pyrolysis furnace, a fluid bed pyrolysis furnace, a kiln-type pyrolysis furnace, and the like may be used.

The polymer waste mainly indicates organic waste. Examples include rubber material waste such as tire waste (for example, spew, hub dust, and tires cut into 4 to 32 pieces) and resin material waste including polymer material obtained by a (co)polymerization reaction of hydrocarbon monomer, such as polyethylene, polypropylene, styrene-butadiene copolymer, or the like; a copolymer of hydrocarbon monomer and another monomer, such as ethylene-vinyl acetate copolymer; a (co)polymer of a halogen derivative of hydrocarbon monomer, such as polyvinyl chloride; and the like. Note that in the residue remaining after thermal decomposition of tire waste, steel cords, wire, or the like may be mixed with the carbide.

Furthermore, in the thermal decomposition or incomplete combustion of polymer waste, the processing temperature is preferably controlled to be in a range of 300° C. to 600° C. If the processing temperature is within the above specified range, thermal decomposition or incomplete combustion of the polymer waste can be performed stably and continuously. If the processing temperature is less than 300° C., the thermal decomposition reaction or incomplete combustion reaction does not proceed sufficiently, resulting in a risk of generating a carbide from which components that should decompose are not completely removed. On the other hand, at a temperature of over 600° C., the generated carbide experiences an undesired reforming reaction or inactivation reaction with other components existing in the reaction system, leading to the risk of generation of a porous carbide that might adversely influence the effect of reinforcing rubber.

When using tire waste, for example, the carbide (A) obtained by thermal decomposition or incomplete combustion of polymer waste is mixed with steel cords, wire, and the like, which are aggregate for a tire, and therefore a magnet, sieve, or the like is preferably used to separate the steel cords, wire, and the like. Furthermore, the carbide (A) is granulated during the process of manufacturing the carbide for reinforcing rubber articles, as described above, yet carbide obtained by thermal decomposition or incomplete combustion of polymer waste is formed partially from lumps that agglomerate during the carbonization process and partially from powder. Accordingly, it is preferable for example to grind the carbide finely in a crushing step using a crusher or the like.

In the method according to the present invention for manufacturing a carbide for reinforcing rubber articles, the carbon black (B) is an industrially important primary material formed nearly entirely from carbon and obtained by injecting a raw material into a space under strictly controlled temperature conditions and subjecting the raw material to thermal decomposition or incomplete combustion. The method for manufacturing the carbon black (B) is not particularly limited, and a normal method for manufacturing carbon black may be used, such as a thermal decomposition method or incomplete combustion method. Furthermore, gas or liquid hydrocarbons are normally used as the raw material for the carbon black (B), and examples include hydrocarbons such as ethylene bottom oil, catalytic cracking residual oil, heavy oil, natural gas, acetylene, and the like. Note that commercial carbon black may be used as the carbon black (B), and from the perspective of application to tire members, carbon black grades of GPF, FEF, HAF, ISAF, SAF, and the like are particularly preferable.

Furthermore, the carbon black (B) is preferably a powdered material obtained during manufacture of carbon black or a ground product of a granular material after granulation.

The blend of the carbide (A) and the carbon black (B) obtained by the method of manufacturing according to the present invention is suitable as reinforcement material for tire members including beads, treads, sidewalls, bead filler, inner liner, and the like, as well as for rubber articles such as belts, air springs, rubber hoses, vibration absorbing rubber, and the like.

EXAMPLES

The present invention is described in further detail below with examples, yet the present invention is in no way limited to the following examples.

Example of Manufacturing Carbide (A)

Tire waste was placed into a pyrolysis furnace and subjected to thermal decomposition in an oxygen-free atmosphere to manufacture the carbide (A).

Figure 1:
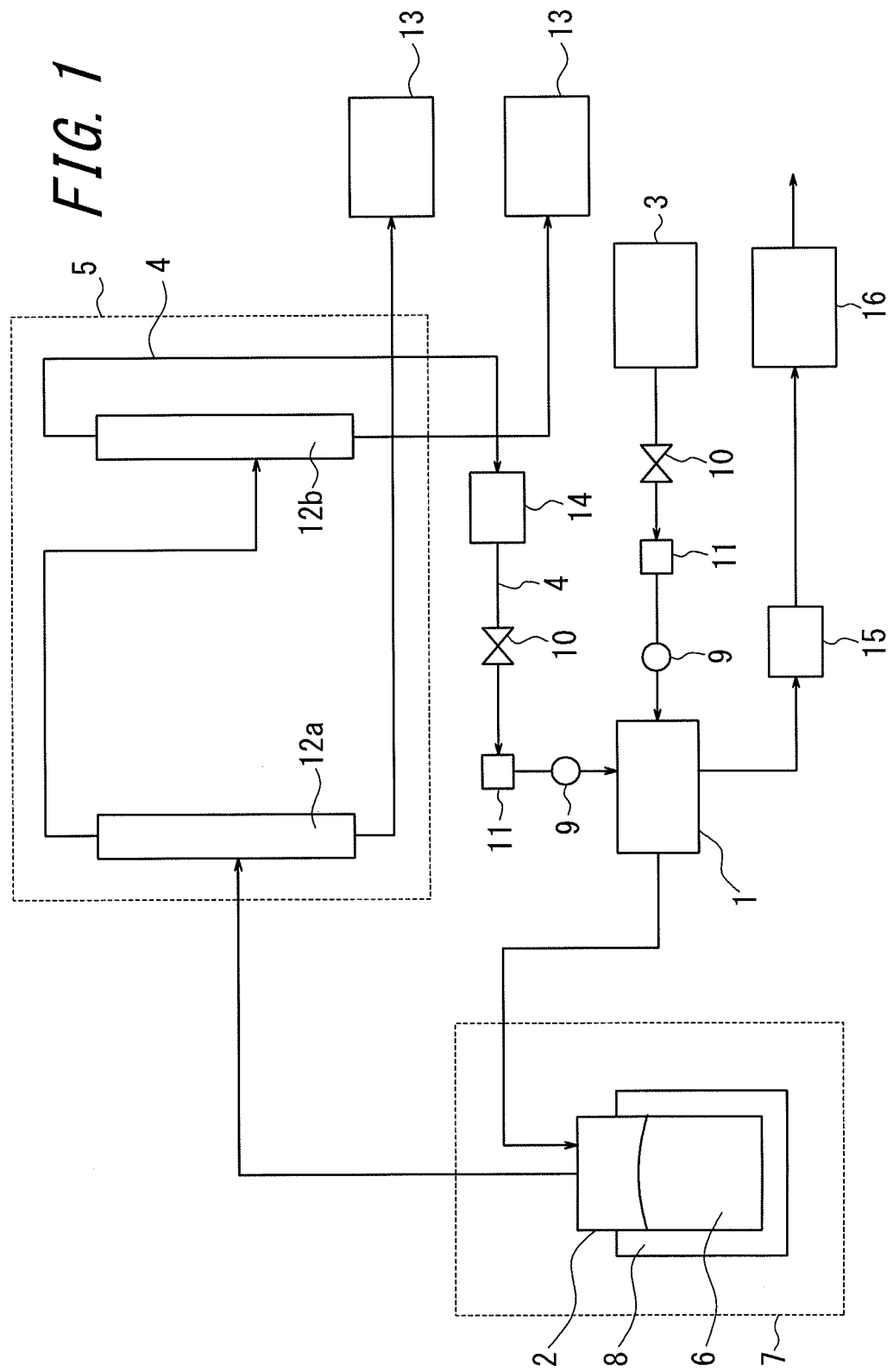
FIG. 1 schematically illustrates a thermal decomposition device used in manufacturing the carbide (A)

Using the thermal decomposition device illustrated in FIG. 1, a carbide was collected from a scrap truck tire.

The thermal decomposition device illustrated in FIG. 1 is a thermal decomposition device suitable for manufacturing the carbide (A) and is provided with the following: a heat exchanger 1 for heating anoxic gas; a decomposition device 7 that includes a pyrolysis furnace 2, containing therein polymer waste 6, and an external heating unit 8 that heats the pyrolysis furnace 2 from the outside, the decomposition device 7 being for generating thermal decomposition gas by causing the polymer waste 6 to thermally decompose by direct contact with the anoxic gas heated by the heat exchanger 1; an oil recovery device 5 for cooling thermal decomposition gas produced in the decomposition device 7 to recover condensed oil; a cyclic path 4 for providing the gas remaining after oil recovery by the oil recovery device 5 to the heat exchanger 1 as anoxic gas; and an anoxic gas supply source 3 for supplying anoxic gas to the heat exchanger 1. The thermal decomposition device illustrated in FIG. 1 is also provided with a flowmeter 9, a damper 10, and an air blower 11 in pipework connecting the anoxic gas supply source 3 and the heat exchanger 1 in order to supply anoxic gas from the anoxic gas supply source 3 and is provided with a flowmeter 9, a damper 10, an air blower 11, and a hot-blast stove 14 in the cyclic path 4 in order to circulate the gas remaining after recovery in the oil recovery device 5 to the heat exchanger 1 as anoxic gas. Furthermore, the oil recovery device 5 illustrated in FIG. 1 is provided with a plurality of dry distillation towers 12a and 12b for separating the recovered oil in accordance with its boiling point. The bottom of each dry distillation tower 12 is connected to a recovery tank 13 through pipework and can store recovered oil. Additionally, in the thermal decomposition device illustrated in FIG. 1, surplus gas can be processed in an exhaust gas treatment device 16 via an exhaust ventilator 15 and subsequently emitted into the atmosphere.

In detail, approximately 100 kg of cut-up scrap truck tires (polymer waste 6) were placed in the pyrolysis furnace 2 (capacity of 0.5 m$^3$) and after substituting the gas in the pyrolysis furnace 2 with nitrogen gas, the gas temperature was raised to approximately 500° C. with the heat exchanger 1 while circulating the nitrogen gas in the thermal decomposition device, and this temperature was maintained. Note that the gas flow rate of the nitrogen gas conducted into the pyrolysis furnace 2 was set to 0.005 m$^3$/s ntp and controlled within a range of 0.0045 m$^3$/s ntp to 0.0055 m$^3$/s ntp. The oxygen concentration within the thermal decomposition device was controlled within a range of 1% by volume or less. A zirconia type oxygen sensor was used for measurement of the oxygen concentration in the thermal decomposition device. After one hour from the start of heating by the heat exchanger 1, thermal decomposition gas began to distill in the dry distillation tower 12a, and after approximately four hours from the start of heating by the heat exchanger 1, distillation ceased. The ceasing of distillation indicated that the thermal decomposition reaction was complete. The heat exchanger 1 was then stopped and allowed to cool for approximately 12 hours. Subsequently, carbide was removed from the pyrolysis furnace 2. Since steel cords and the like, which are tire material, were included in the carbide, the superfluous tire material was removed with a magnet separator. The carbide from which the superfluous tire material was removed was crushed with a hammer-type crusher to a fine powder having a particle diameter of 1 mm or less. The ground product was classified with a pneumatic classifier having a rotating blade so as to remove coarse particles with a particle diameter of 50 μm or more, and a classifying device was used to yield minute carbide (A) having a particle diameter of 10 μm or less and a modal value of 4 μm.

This minute carbide for rubber combination had a nitrogen absorption specific surface area (NSA) of 81.6 m$^2$/g and a DBP absorption value of 85.2 ml/100 g.

Example of Manufacturing Carbon Black (B)

Using the soft carbon black manufacturing device disclosed in JP61-034071A (applicant: Asahi Carbon Co., Ltd.), GPF grade carbon black (B) was manufactured by applying the manufacturing conditions recited in Claim 1 of JP61-034071A. The production yield of GPF grade carbon black with the above manufacturing conditions was 150 kg/h.

Commercial carbon black may also be used.

Example 1

Into a pin-type granulating machine having pins implanted in an internal cylinder, 500 g of the carbide (A) obtained in the above manufacturing example and 500 g of GPF grade carbon black (B) (Trade name: Asahi #55, Asahi Carbon Co., Ltd.; a non-granulated powder manufactured and collected in the above manufacturing example) were placed and were mixed, while adding 0.7 L/h of water, by rotating at 80 rpm, a rotation speed much lower (approximately ¼) than that of conventional carbon black granulation conditions. The mixture was then granulated under the granulation conditions listed in the column for Example 1 in Table 4-1 to manufacture a moist carbide for reinforcing rubber (carbon material) II.

The moist mixed carbide for reinforcing rubber (carbon material) II obtained by the above treatment was dried with a cylindrical rotary kiln-type drier (internal diameter 200 mm, length 400 mm) having a rotating central shaft provided with a combustion burner at the bottom thereof to yield mixed carbide (carbon material) II.

Example 2

A carbide for reinforcing rubber articles was obtained in the same way as Example 1, except that the rotation speed of the pin-type granulating machine was set to 100 rpm.

Example 3

A carbide for reinforcing rubber articles was obtained in the same way as Example 1, except that the rotation speed of the pin-type granulating machine was set to 120 rpm.

Comparative Example 1

Using a volumetric feeder, 100 kg of the carbide (A) obtained in the above manufacturing example was added by increments, through a powder supply port in a pin-type granulating device installed in the carbon black manufacturing step, to GPF grade carbon black (B) obtained in the above manufacturing example. Granulation treatment was performed by mixing the carbide (A) and carbon black (B) using a pin-type granulating machine rotated at 350 rpm, the rotation speed normally used when granulating carbon black, while detecting the torque on the rotation axis of the granulating machine and controlling the amount of added water. The generated moist mixed granular material was dried by a subsequent drying step in accordance with a regular carbon black manufacturing process, thus yielding carbide material for reinforcing rubber articles.

Comparative Example 2

A mixture of (A) and (B) was granulated and dried to yield a carbide for reinforcing rubber articles under the same conditions as Example 1, except that the rotation speed of the pin-type granulating machine was set to 160 rpm.

Comparative Example 3

A carbide for reinforcing rubber articles was obtained in the same way as Comparative Example 1, except that instead of granulating the mixture of the carbide (A) and the carbon black (B), the carbide (A) and the carbon black (B) were first granulated and then mixed.

Figure 3:
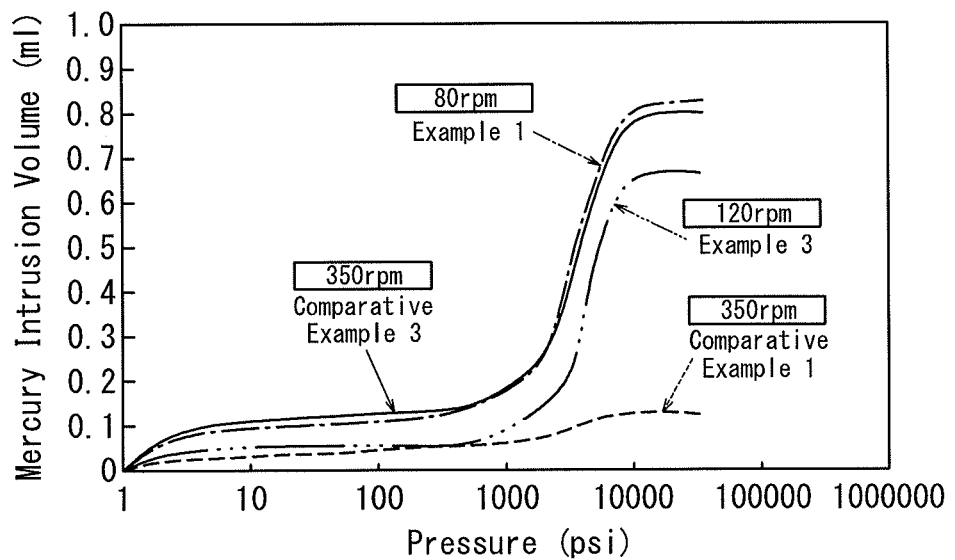
FIG. 3 illustrates the relationship between mercury intrusion volume and pressure (units: psi).

For the carbide (A) and the carbon black (B) obtained in the above manufacturing example, as well as the carbide for reinforcing rubber articles of Examples 1 to 3 and Comparative Examples 1 to 3, the dibutyl phthalate (DBP) absorption value and mercury intrusion volume were measured with the following method. Table 1 and FIGS. 2 and 3 list the results. FIGS. 2 and 3 illustrate the relationship between mercury intrusion volume and pressure. The results show that the DBP absorption value is lower for the carbide for reinforcing rubber articles of Comparative Example 1 than for the carbide (A) and the carbon black (B). Furthermore, for the carbide for reinforcing rubber articles of Comparative Example 1, the mercury intrusion volume is drastically reduced as compared to the other examples, presumably because the pore volume in the structure was reduced, reducing the absorption rubber (i.e. the absorbed amount of rubber molecules). It is inferred that a reduction in the modulus (Mo) occurred for this reason.

TABLE 1

|  | DBP absorption value (ml/100 g) |
|---|---|
| Carbon black (B) | 83.2 |
| Carbide for reinforcing rubber articles (Example 1) | 81.7 |
| Carbide for reinforcing rubber articles (Example 2) | 79.7 |
| Carbide for reinforcing rubber articles (Example 3) | 77.1 |
| Carbide for reinforcing rubber articles (Comparative Example 1) | 73.5 |
| Carbide for reinforcing rubber articles (Comparative Example 2) | 81.5 |
| Carbide for reinforcing rubber articles (Comparative Example 3) | 84.1 |
| Carbide (A) | 85.2 |

(1) Dibutyl Phthalate (DBP) Absorption Value

The dibutyl phthalate (DBP) absorption value was measured in conformity with JIS K 6217-4:2001.

(2) Mercury Intrusion Volume

The mercury intrusion volume was measured with a mercury porosimeter in conformity with JIS R 1655:2003.

Using the carbide (A) and the carbon black (B) obtained in the above manufacturing example, as well as the carbide for reinforcing rubber articles of Examples 1 to 3 and Comparative Examples 1 to 3, rubber compositions were prepared with the formulations listed in Table 2, and rubber properties (tensile stress and tensile strength) after vulcanization of the rubber compositions were measured with the following method.

(3) Rubber Properties After Vulcanization (a) Tensile Stress

Tensile stress at 300% elongation was measured in conformity with JIS K6251:2004 at room temperature for vulcanized rubber obtained by vulcanization for 30 minutes at 140° C. and was expressed as an index, with a value of 100 for the tensile stress of a rubber composition with which only GPF grade carbon black (Asahi Carbon Co., Ltd.; trade name: Asahi #55) was combined. A larger index indicates a larger tensile stress and a higher degree of elasticity.

(b) Tensile Strength

Tensile strength (Tb) was measured in conformity with JIS K6251:2004 at room temperature for vulcanized rubber obtained by vulcanization for 30 minutes at 140° C. and was expressed as an index, with a value of 100 for the tensile strength of a rubber composition with which only GPF grade carbon black (Asahi Carbon Co., Ltd.; trade name: Asahi #55) was combined. A larger index indicates a greater resistance to crushing and a better reinforcing property.

TABLE 2

|  |  | Parts by mass |
|---|---|---|
| Non-pro | SBR *1 | 127.3 |
|  | bromobutyl rubber *2 | — |
|  | natural rubber | — |
|  | carbon black or carbide *3 | 65 |
|  | stearic acid | 1 |
|  | antioxidant *4 | — |
|  | aromatic oil | — |
|  | vulcanization accelerator *5 | — |
|  | antioxidant *6 | — |
| Pro | zinc oxide | 3 |
|  | vulcanization accelerator *5 | 1.5 |
|  | vulcanization accelerator *7 | 0.5 |
|  | vulcanization accelerator *8 | — |
|  | sulfur | 1.5 |

*1 Oil extended rubber, oil extended with 27.3 parts by mass of aromatic oil per 100 parts by mass of rubber component. Manufactured by JSR Corporation; trade name: SBR 1723.
*2 Manufactured by JSR Corporation; trade name: BROMOBUTYL 2255.
*3 Table 1 lists the type of carbon black or carbide used from among the carbide (A) and the carbon black (B) obtained in the above manufacturing example and the carbide for reinforcing rubber articles obtained in Examples 1 to 3 and Comparative Examples 1 to 3.
*4 Manufactured by FlexSys Inc.; trade name: Santoflex 6PPD.
*5 Manufactured by Ouchi Shinko Chemical Industrial Co., Ltd.; trade name: Nocceler DM-P.
*6 Manufactured by Ouchi Shinko Chemical Industrial Co., Ltd.; trade name: Nocrac 224.
*7 Manufactured by Ouchi Shinko Chemical Industrial Co., Ltd.; trade name: Nocceler D.
*8 Manufactured by Ouchi Shinko Chemical Industrial Co., Ltd.; trade name: Nocceler NS.

TABLE 3

|  |  | Ex. 1: 80 rpm | Ex. 2: 100 rpm | Ex. 3: 120 rpm | Comp. Ex. 1: 350 rpm | Comp. Ex. 2: 160 rpm | Comp. Ex. 3: 350 rpm, granular blend |
|---|---|---|---|---|---|---|---|
| 300% modulus | index | 98 | 97 | 96 | 86 | 91 | 97 |
| Tensile strength |  | 114 | 114 | 117 | 117 | 115 | 113 |

Next, the carbides for reinforcing rubber articles in Examples 2 to 3 and Comparative Examples 1 to 3 were obtained in the same way as Example 1, except for changing to the granulation conditions listed in Table 4, and the mercury intrusion volume of the carbides for reinforcing rubber articles was measured with the above method. The results are listed in FIG. 3, which illustrates the relationship between mercury intrusion volume and pressure. The results in FIG. 3 show that if both the rotation speed and the supply are too high, the mercury intrusion volume of the carbide drastically reduces, yet the mercury intrusion volume of the carbide can be recovered by reducing the supply.

The bead hardness of the carbides for reinforcing rubber articles was also measured with the following method. Table 4 lists the results.

(4) Bead Hardness

The bead hardness was measured in conformity with JIS K 6219-3:2005.

TABLE 4

|  |  | Ex. 1: 80 rpm | Ex. 2: 100 rpm | Ex. 3: 120 rpm | Comp. Ex. 1: 350 rpm | Comp. Ex. 2: 160 rpm | Comp. Ex. 3: 350 rpm, granular blend |
|---|---|---|---|---|---|---|---|
| Granulation conditions | rotation speed (rpm) | 80 | 100 | 120 | 350 | 160 | 350 |
|  | granulation time (min) | 2 | 2 | 2 | 2 | 2 | 2 |

TABLE 4-continued

|  |  | Ex. 1: 80 rpm | Ex. 2: 100 rpm | Ex. 3: 120 rpm | Comp. Ex. 1: 350 rpm | Comp. Ex. 2: 160 rpm | Comp. Ex. 3: 350 rpm, granular blend |
|---|---|---|---|---|---|---|---|
| Bead hardness | (maximum, cN) | 22.5 | 30.4 | 44.5 | 54.9 | 29.8 | 42.3 |
|  | (minimum, cN) | 4.3 | 4.7 | 5.4 | 7.1 | 1.9 | 5.3 |
|  | (average, cN) | 11.4 | 14.8 | 16.5 | 20.3 | 17.4 | 15.7 |

REFERENCE SIGNS LIST

1: Heat exchanger
2: Pyrolysis furnace
3: Anoxic gas supply source
4: Cyclic path
5: Oil recovery device
6: Polymer waste
7: Decomposition device
8: External heating unit
9: Flowmeter
10: Damper
11: Air blower
12: Dry distillation tower
13: Recovery tank
14: Hot-blast stove
15: Exhaust ventilator
16: Exhaust gas treatment device

The invention claimed is:

1. A method for manufacturing a carbide for reinforcing rubber articles comprising the steps of:
   mixing a carbide, obtained by thermal decomposition or incomplete combustion of polymer waste and pulverized by grinding, with carbon black to obtain a mixture of the carbide and the carbon black; and
   granulating the mixture in an amount range of 1 kg to 2 kg using a granulating machine at a rotation speed of 70 rpm to 130 rpm and for a time range of 110 s to 130 s.

2. The method for manufacturing a carbide for reinforcing rubber articles according to claim 1, wherein a mixture mass ratio of the carbide to the carbon black is in a range of 1/99 to 50/50.

3. The method for manufacturing a carbide for reinforcing rubber articles according to claim 2, wherein the carbon black is a powdered material or a ground product of a granular material.

4. The method for manufacturing a carbide for reinforcing rubber articles according to claim 1, wherein the carbon black is a powdered material or a ground product of a granular material.

5. The method for manufacturing a carbide for reinforcing rubber articles according to claim 1, wherein the rotation speed is 110 rpm to 130 rpm.

6. The method for manufacturing a carbide for reinforcing rubber articles according to claim 1, wherein the carbide is obtained by thermal decomposition or incomplete combustion of polymer waste at a temperature in the range of 300° C. to 600° C.

* * * * *